US010085418B2

(12) United States Patent
Bales et al.

(10) Patent No.: US 10,085,418 B2
(45) Date of Patent: Oct. 2, 2018

(54) SYSTEMS FOR FEEDING CATS, METHODS OF USE OF THE SYSTEMS AND PACKAGING FOR THE SYSTEMS

(71) Applicant: Feline Environmental Enrichment Design Company LLC, Philadelphia, PA (US)

(72) Inventors: Elizabeth B. Bales, Philadelphia, PA (US); Steven B. Krupnick, Philadelphia, PA (US)

(73) Assignee: FELINE ENVIRONMENTAL ENRICHMENT DESIGN CORPORATION, Wilmington, DE (US)

( * ) Notice: Subject to any disclaimer, the term of this patent is extended or adjusted under 35 U.S.C. 154(b) by 15 days.

(21) Appl. No.: 15/074,557

(22) Filed: Mar. 18, 2016

(65) Prior Publication Data
US 2016/0278341 A1    Sep. 29, 2016

Related U.S. Application Data

(60) Provisional application No. 62/137,501, filed on Mar. 24, 2015, provisional application No. 62/221,768, filed on Sep. 22, 2015.

(51) Int. Cl.
*A01K 5/00*  (2006.01)
*A01K 5/01*  (2006.01)
*A01K 15/02* (2006.01)

(52) U.S. Cl.
CPC .............. *A01K 5/00* (2013.01); *A01K 5/0114* (2013.01); *A01K 15/025* (2013.01)

(58) Field of Classification Search
CPC ...... A01K 5/00; A01K 5/0114; A01K 39/012; A01K 39/0113; A01K 5/0275;
(Continued)

(56) References Cited

U.S. PATENT DOCUMENTS 2,086,631 A * 7/1937 Munro ................ A63H 33/00
                                                    119/711
3,341,054 A * 9/1967 Hirota ................. B65D 1/243
                                                    220/518
(Continued)

FOREIGN PATENT DOCUMENTS

DE        29703253 U1    6/1997
GB         2492110 A    12/2012

OTHER PUBLICATIONS

Horwitz et al., Nov. 30, 2008, VCA, https://vcahospitals.com/know-your-pet/cat-behavior-and-training-enrichment-for-indoor-cats, "Should I feed my cat . . ." section.*
(Continued)

*Primary Examiner* — Tien Q Dinh
*Assistant Examiner* — Christopher D Hutchens
(74) *Attorney, Agent, or Firm* — Morgan, Lewis & Bockius LLP

(57) ABSTRACT

A feeding system and methods for feeding cats is disclosed. The system includes a package holding plural feeding devices. Each feeding device is made up of a hollow container configured to dispense a portion of the daily ration of a cat's dry cat food therefrom. Each feeding device has an internal cavity bounded by an arcuate external surface that provides the appearance of a creature that constitutes prey of a feral cat. The container has an outlet port configured to enable a portion of the cat food to gradually exit from outlet port when the container is rolled on a surface by the cat playing with the feeding device. The feeding system may include a plurality of feeding devices packaged together.

10 Claims, 2 Drawing Sheets

(58) Field of Classification Search
CPC ........ A01K 15/02; A01K 39/014; A01K 5/01; A01K 29/00; A01K 5/0142; A01K 15/021; A01K 39/0106; A01K 5/0233; A01K 5/0241; A01K 1/105; A01K 39/0125; A01K 5/0121; A01K 5/0128; A01K 5/025; A01K 7/06; A01K 15/025; A01K 5/0135; A01K 7/005
USPC ..... 119/61.31, 709, 61.4, 61.5, 61.51, 51.01, 119/707
See application file for complete search history.

(56) References Cited

U.S. PATENT DOCUMENTS

| | | | | |
|---|---|---|---|---|
| 4,293,015 | A * | 10/1981 | McGough | B65D 81/3886 150/901 |
| 4,914,860 | A * | 4/1990 | Richardson | A47G 7/08 47/67 |
| 4,978,030 | A | 12/1990 | Morris et al. | |
| 5,458,087 | A * | 10/1995 | Prior | A01K 5/0114 119/51.5 |
| 5,819,690 | A * | 10/1998 | Brown | A01K 5/0114 119/707 |
| 6,098,571 | A * | 8/2000 | Axelrod | A01K 5/0114 119/707 |
| 6,158,391 | A * | 12/2000 | Simonetti | A01K 5/0114 119/702 |
| 6,167,841 | B1 * | 1/2001 | Ho | A01K 5/0114 119/57.91 |
| 6,237,538 | B1 * | 5/2001 | Tsengas | A01K 5/0114 119/707 |
| 6,378,464 | B1 * | 4/2002 | Ritchey | A01K 15/025 119/708 |
| 8,240,273 | B2 | 8/2012 | Benson | |
| D790,138 | S * | 6/2017 | Bales | D30/121 |
| 2002/0174838 | A1 | 11/2002 | Crane et al. | |
| 2005/0268862 | A1* | 12/2005 | Morrison | A01K 15/025 119/707 |
| 2006/0054106 | A1* | 3/2006 | Renforth | A01K 15/025 119/711 |
| 2006/0137624 | A1* | 6/2006 | Lamstein | A01K 15/025 119/711 |
| 2006/0213454 | A1* | 9/2006 | Wolfe, Jr. | A01K 5/0114 119/709 |
| 2006/0254531 | A1* | 11/2006 | Willinger | A01K 5/0114 119/710 |
| 2007/0022971 | A1* | 2/2007 | Renforth | A01K 15/026 119/707 |
| 2007/0028519 | A1* | 2/2007 | Seibel | A47G 7/085 47/72 |
| 2008/0050998 | A1* | 2/2008 | Polfliet | A47G 7/08 446/72 |
| 2008/0083378 | A1* | 4/2008 | Pearce | A01K 5/0114 119/707 |
| 2009/0314221 | A1* | 12/2009 | Wang | A01K 15/025 119/707 |
| 2010/0147229 | A1* | 6/2010 | DeFazio | A01K 15/025 119/710 |
| 2010/0251966 | A1* | 10/2010 | Benson | A01K 5/0114 119/51.01 |
| 2010/0300363 | A1* | 12/2010 | Nangia | A01K 7/00 119/51.01 |
| 2011/0083608 | A1* | 4/2011 | Markham | A01K 15/025 119/51.01 |
| 2011/0185980 | A1* | 8/2011 | Chefetz | A01K 29/00 119/709 |
| 2011/0277696 | A1* | 11/2011 | Rutherford | A01K 15/026 119/707 |
| 2012/0067294 | A1* | 3/2012 | Curry | A01K 15/025 119/707 |
| 2012/0318210 | A1* | 12/2012 | Anderson | A01K 5/0114 119/710 |
| 2013/0019812 | A1* | 1/2013 | Rutherford | A01K 15/025 119/707 |
| 2013/0055965 | A1* | 3/2013 | Valle | A01K 15/025 119/710 |
| 2013/0115400 | A1* | 5/2013 | Chou | A01K 15/025 428/36.8 |
| 2013/0276711 | A1 | 10/2013 | Lipscomb et al. | |
| 2014/0367284 | A1 | 12/2014 | Wurth et al. | |
| 2014/0373788 | A1* | 12/2014 | Ragonetti | A01K 15/025 119/51.01 |
| 2015/0101546 | A1* | 4/2015 | Simon | A01K 15/025 119/710 |
| 2016/0029597 | A1* | 2/2016 | Gratza | A01K 15/025 119/707 |
| 2016/0120146 | A1* | 5/2016 | Parness | A01K 5/0114 119/61.4 |
| 2016/0165845 | A1* | 6/2016 | Stone | A01K 15/025 119/51.01 |
| 2016/0219835 | A1* | 8/2016 | Faecher | A01K 15/025 |
| 2016/0278341 | A1 | 9/2016 | Bales et al. | |
| 2016/0316719 | A1* | 11/2016 | Parness | A01K 15/025 |

OTHER PUBLICATIONS

Kong Company, Jul. 15, 2012, https://web.archive.org/web/20120715085715/https://www.kongcompany.com/expert-tips/holiday-tips-for-happy-pets/, "Home Alone" section.*

Cat Treat Dispenser Toys Reviews; http://www.catfood-dispensersreviews.com/cat-treat-dispensers-toys-reviews/; accessed Jul. 26, 2016.

International Search Report and Written Opinion dated Jun. 24, 2016 for International Patent Application No. PCT/US2016/023693, 15 pages.

International Search Report and Written Opinion dated Dec. 7, 2016 for International Patent Application No. PCT/US2016/023693, 6 pages.

* cited by examiner

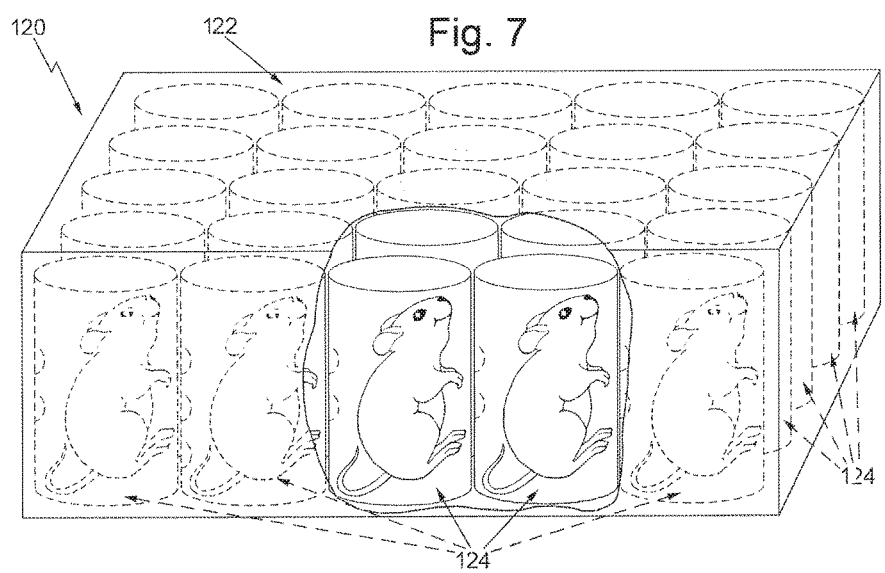
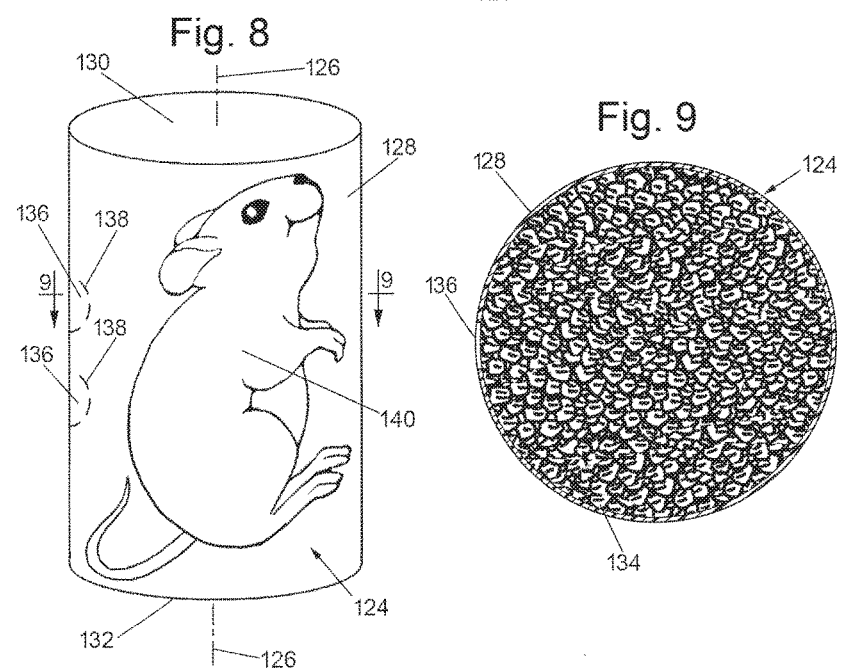

SYSTEMS FOR FEEDING CATS, METHODS OF USE OF THE SYSTEMS AND PACKAGING FOR THE SYSTEMS

CROSS-REFERENCE TO RELATED APPLICATIONS

This application claims priority under 35 U.S.C. § 119(e) from U.S. Provisional applications Ser. No. 62/137,501, filed on Mar. 24, 2015, entitled System For Feeding Cat Food And Methods Of Use Of Said System, and Ser. No. 62/221,768, filed on Sep. 22, 2015, entitled Packaging System For Feeding Cats And Method Of Use Of The System, the entire contents of both applications being assigned to the same assignee as this invention and whose disclosures are incorporated in their entirety by reference herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

FIELD OF THE INVENTION

The disclosed invention relates to dispensing devices and more particularly to feeding systems for use by a cat to dispense cat food therefrom when played with by the cat, methods of feeding a cat, and packaging for such feeding systems.

BACKGROUND OF THE INVENTION

The American Veterinary Medical Association recommends that cats in urban and suburban environments be kept indoors. However, a cat's health and welfare can be affected by its surroundings. In this regard, cats are natural hunters. Even indoors, cats retain their predatory instincts and behaviors, including stalking, clawing, chewing, and marking. When cats live indoors, they are deprived of natural outlets for these behaviors. Under these circumstances cats may begin to express undesirable behaviors, including scratching furniture and eliminating outside of the litter box.

While commercially available dry cat food satisfies the nutritional needs for domestic cats, it does nothing to allow a cat to express its natural hunting behavior. It is much healthier for cats to be given the option to hunt for prey. Failure to provide opportunities to hunt deprives cats of mental stimulation and physical activity. This can cause obesity and other health and behavioral problems. Accordingly, a need exists for a cat food feeding system that enables an indoor cat to employ its natural hunting instincts.

The subject invention addresses that need by providing feeding systems for indoor cats to enable such cats to feed themselves several times a day with dry cat food in a safe, easy-to-use manner that enriches their body, mind and spirit.

In addition, the subject invention is directed to packaging for such cat feeding systems.

SUMMARY OF THE INVENTION

In accordance with one aspect of this invention there is provided a feeding device for use by a cat to dispense dry cat food from the device. The feeding device comprises a hollow container having an internal cavity and at least one outlet port in communication with the internal cavity. The feeding device has an arcuate external surface providing the appearance of a creature that constitutes prey of a feral cat. The arcuate external surface is configured to roll on a surface when the cat plays with the feeding device, whereupon the action of the cat playing with the feeding device results in the automatic gradual dispensing of a portion of the cat food out of the at least one outlet port.

In accordance with one aspect of this invention the feeding device comprises the hollow container and a simulation covering. The hollow container has an internal cavity, an entry port and at least one outlet port. The at least one outlet port is in communication with the internal cavity and is configured to enable a portion of the cat food to gradually pass through the at least one outlet port. The simulation covering comprises a soft material having a pocket to receive at least a portion of the hollow container, whereupon the at least one outlet port is exposed. The simulation covering has an exterior surface providing the appearance of a creature that constitutes prey of a feral cat such that when the hollow container is disposed within the pocket of the simulation covering the cat will play with the feeding device. The action of the cat playing with the feeding device results in the automatic gradual dispensing of a portion of the cat food out of the at least one outlet port.

In accordance with another aspect of this invention the hollow container has a longitudinal axis an arcuate sidewall bounding the interior cavity. The interior cavity is filled with dry cat food. The arcuate sidewall has an outer surface providing the appearance of a creature that constitutes prey of a feral cat and includes a plurality of frangible areas. Each of those areas is configured to be opened to form respective outlet ports in the sidewall. The outlet ports are in communication with the internal cavity and are configured to enable a portion of the dry cat food to gradually pass therethrough when the cat plays with the feeding device.

In accordance with one preferred aspect of the invention the feeding device is a part of a feeding system including plural feeding devices, each of which is arranged to hold a portion of the cat's daily ration of dry cat food and which can be located in various locations to which the cat has access. This enables the cat to utilize its natural hunting instinct to feed itself several times a day.

The subject invention also includes a method for feeding a cat a predetermined portion of a daily ration of cat food each day such that the cat eats its daily ration each day. The method basically entails making a feeding device constructed in accordance with this invention available to the cat so that the cat will "hunt" for the feeding device and play with it when found, whereupon a portion of the cat food disposed within the internal cavity can gradually exit the at least one port when the cat plays with the device.

In accordance with one preferred aspect of the method of this invention plural, e.g., five, feeding devices, each filled with a predetermined portion of the daily ration of cat food, are disposed at various locations to which the cat has access, such that the cat can find each of the feeding devices to play with each of them and thereby have access to the food contained therein.

In accordance with another aspect of this invention there is provided a package holding a plurality of feeding devices. Each of the feeding devices is configured for use by a cat to dispense dry cat food therefrom. Each of the feeding devices comprises a container, e.g., an ovoid, ellipsoid, sphere or other three dimensional shaped hollow body, having a longitudinal axis and an arcuate sidewall bounding an interior cavity. The interior cavity is filled with dry cat food. The sidewall has an outer surface providing the appearance of a creature that constitutes prey of a feral cat. The arcuate sidewall includes a plurality of frangible areas, e.g., a line of perforations, each of which is configured to be opened to form respective outlet ports in the sidewall. The outlet ports, when formed are in communication with the internal cavity and are configured to enable a portion of the dry cat food to gradually pass therethrough. Each of the feeding devices is configured to be played with by a cat so that the action of the cat playing with the feeding device results in the automatic gradual dispensing of a portion of the cat food out of the outlet ports.

One preferred aspect of the package includes a sufficient number feeding devices, each holding a portion of the cat's daily ration of food, and which collectively provide the cat with his/her daily ration of cat food.

BRIEF DESCRIPTION OF THE DRAWING FIGURES

FIG. 7 is an isometric view, partially broken away, of one exemplary package holding a plurality of feeding devices, each of which is constructed in accordance with one aspect of this invention and is configured for use by a cat to dispense dry cat food therefrom;

FIG. 8 is an enlarged isometric view of one of the exemplary feeding devices shown in FIG. 7; and FIG. 9 is an enlarged sectional view of the exemplary feeding device taken along line 9-9 of FIG. 3.

DETAILED DESCRIPTION OF THE PREFERRED EMBODIMENTS

Figure 1:
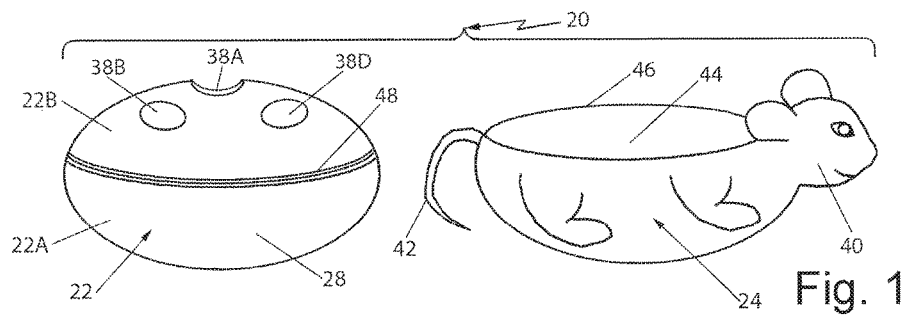
FIG. 1 is an isometric view of one exemplary hollow container and one exemplary simulation covering which together make up a feeding device forming one component of a cat feeding system constructed in accordance with this invention.

Referring now to the drawings wherein like characters refer to like parts, there is shown in FIG. 1 an exemplary embodiment of a feeding device 20 constructed in accordance with this invention. The device 20 forms a portion of a feeding system of this invention. That feeding system includes plural feeding devices. Each feeding device is configured so that it provides the appearance of a creature on which a feral cat preys for food. It has been determined that in nature the average feral cat hunts and eats five times a day. Accordingly, in accordance with one preferred aspect of this invention the system includes five feeding devices, each of which is filled with one fifth of the cat's daily ration of dry cat food. The feeding devices are disposed throughout the cat's environment in the home, and preferably are hidden, so that the cat will "hunt" for them, thereby providing the cat with natural stimulation. Owing to the shape of the feeding device, i.e., it is configured to roll about its longitudinal axis, and its appearance, i.e., simulating a prey animal, when the feeding device is found and the cat plays with it, a portion of the dry cat food within the feeding device will be automatically dispensed out of it gradually, thereby enabling the cat to eat the dispensed food. This action provides further stimulation for the cat, in addition to feeding it.

Figure 2:
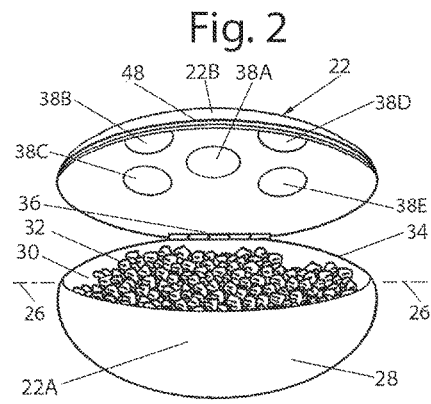
FIG. 2 is a slightly enlarged isometric view of the exemplary hollow container shown in FIG. 1, with its lid being opened to enable it to be filled with a portion of a cat's daily ration of dry cat food.
Figure 3:
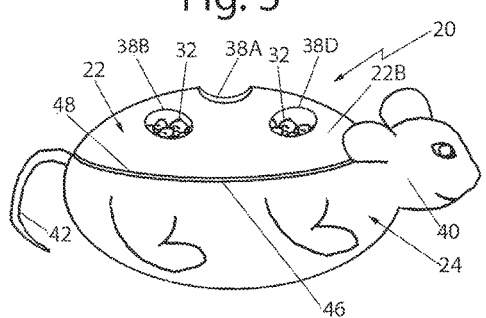
FIG. 3 is a slightly enlarged isometric view of the filled hollow container shown in FIG.1 after its lid has been closed and after it has been inserted into the simulation covering to result in a feeding device which has the appearance of a creature that constitutes prey of a feral cat.

As can be seen in FIG. 1 the feeding device 20 basically comprises two components, namely, a hollow container 22 and a simulation covering or "skin" 24. The hollow container is formed of any suitable hard and rugged material, such as a plastic, and has the shape of an ovoid, ellipsoid, sphere or other three dimensional shape having a longitudinal axis 26 (FIG. 2) and an arcuate outer surface 28. The arcuate outer surface of the container enables it to be rolled around the axis 26 when the cat plays with the feeding device, as will be described later. Being hollow, the container 22 includes an internal cavity 30 (FIG. 2) which is arranged to hold a portion of a typical indoor cat's daily ration of dry cat food 32. That daily ration of dry cat food is approximately 1.25 cups for the average indoor cat. Thus, if the system makes use of five feeding devices, that 1.25 cups of dry cat food will be divided equally among the five feeding devices. In accordance with one exemplary embodiment of this invention the hollow container has a length of approximately 3.5 inches and a height of approximately 2.5 inches.

The filling of the internal cavity 30 of the container 22 is achieved by means of an inlet port that is in communication with the interior of the internal cavity. To that end, in the exemplary embodiment shown the hollow container includes a main section 22A and a lid section 22B. The top edge of the main section is in the form of a mouth or opening 34 (FIG. 2), which serves as the inlet port to the container 22. The lid section 22B is connected to the main section 22C by a hinge 36. This enables the lid section 22B to be pivoted from a closed position, like shown in FIG. 1, to an open position, like shown in FIG. 2.

In the open position the lid section is pivoted up from the opening 34, thereby exposing the internal cavity 30 so that it can be filled with the portion of dry cat food 32. Once filled, the lid section can be pivoted down to the closed position to thereby close the mouth of the main section to hold the food within the container.

Not only does the use of the hinged lid section 22B provide a means for readily filling the hollow container via a large opening, i.e., the mouth of the main section, the large opening also enables one to readily clean the internal cavity, when necessary. While not shown the lid section and the main section may include some releasable connector, e.g., a snap-fit connector, to hold the lid section in the closed position so that it does not accidentally open when the cat plays with the feeding device.

The lid section also includes at least one outlet port through which the dry cat food within the container can pass when the cat plays with the feeding device. In the exemplary embodiment shown, the at least one outlet port is in the form of five openings or ports 38A, 38B, 38C, 38D and 38E, with the port 38A being centrally located in the lid section and with the other ports disposed about the central port 36A. Each port is of a sufficient size, e.g., 0.375 in.×0.625 in., to enable the dry cat food within the container to gradually exit through one or more of the ports as the cat plays with the feeding device.

The simulation covering or skin 24 is formed of a soft, flexible fabric or other material that provides the appearance of an animal or creature, e.g., rodent, bird, fish, etc., that constitutes the prey of a feral cat. In the exemplary embodiment shown the simulation covering provides the appearance of a mouse. To that end, the simulation covering may be a furry fabric that includes a projection 40 located at one end of the simulation covering and which is in the shape of the head of a mouse and another projection 42 at the other end of the simulation covering and which is in the shape of the tail of the mouse. The projection 40 includes graphics representing the eyes, nose and mouth of the mouse. The central portion of the simulation covering is in the form of a hollow pocket 44 (FIG. 1) shaped and sized to accommodate at least a portion of the hollow container 22 therein and which when the container is located therein makes up the body of the mouse. Graphics representing the mouse's legs are provided on the outer surface of the central portion of the simulation covering. The fact that the head and tail of the mouse are located on opposite ends of the longitudinal axis 26 when the hollow container is disposed within the pocket 44 of the simulation covering enables the resulting feeding device to be able to roll about that axis when played with by the cat. Moreover, since the legs of the mouse are merely graphics on the body, as opposed to members projecting outward from the body, they will not interfere with the rolling action of the feeding device.

It should be pointed out at this juncture, that the head and tail of the mouse may not be in the form of projections, but rather may be in the form of graphics on the outer surface of the simulation covering. Moreover, the simulation covering need not provide the appearance of a mouse, but can provide the appearance of any other rodent, bird, fish or other creature upon which constitutes the prey of a feral cat. Thus, in the case of a bird the simulation covering 22 can include one projection which is in the form of a bird's head and beak, and another projection which is in the form of the bird's tail. Alternatively the head, beak and tail may merely be in the form of graphics on the outer surface of the simulation covering. So too, if the simulation covering is in the form of a fish, it may include a projection which is in the form of a fish's head and mouth, and a projection which is in the form of the fish's tail.

In order to ensure that the hollow container doesn't shift within the pocket and to hold it securely in place within the pocket the entryway to the pocket is in the form of an elasticized edge 46. That elasticized edge is arranged to be received within an annular peripheral groove 48 in the outer surface of the lid section adjacent the free edge of the lid section. Thus, when the hollow container 22 is disposed within the pocket 44 of the simulation covering 24 the elasticized edge 46 of the pocket will tightly engage the peripheral groove 48 to hold the hollow container in place. Such action will prevent the simulation covering from blocking any of the outlet ports 38A-38E when the cat plays with the feeding device.

As mentioned above, a preferred embodiment of the system of this invention makes use of five feeding devices 20 which are filled with the cat's regular dry food and which are disposed, e.g., hidden, at various locations in the cat's normal environment. Some cats may need a refresher course on how to "hunt" and hence feed themselves with the system of this invention. To that end, one can train the cat to use the system. In particular, such training can be accomplished by putting one half of the cat's regular meal in its bowl and one half into a feeding device constructed in accordance with this invention and which is placed near the cat's bowl. That feeding device may be in the form of the feeding device 20 as described earlier or a "trainer" device having more exit ports to allow the food to fall out more easily. In any case, the training method should entail allowing the cat to experiment with getting the food out of the feeding device. Day after day as the cat gets the hang of it, one can gradually put more of the cat's food in the feeding device and less into the cat's bowl. Once the cat has the learned how to use the feeding device, one can then start hiding plural feeding devices in the cat's environment for it to find. Preferably that is done in the beginning by hiding the feeding devices in obvious places, e.g., a few feet away from the cat's regular dining spot. Gradually over the next few weeks, one can make the hiding spots more difficult to find. To enhance the training of the cat, one should attempt avoiding placing the feeding devices near things which produce mechanical noises, such as refrigerators, washing machines, dryers, furnaces, etc.

As should be appreciated by those skilled in the art, the fact that the feeding devices of the subject invention automatically dispense only a portion of the dry cat food therein as the cat plays with the device ensures that the release of the cat food is accomplished in a gradual manner. This action is important inasmuch as it forces the cat to slow down its eating process so that it doesn't gobble its food, which action could encourage vomiting.

It should be pointed out at this juncture that while the preferred system as described above makes use of five feeding devices, the system may make use of any number of feeding devices, including only a single such device.

Figure 4:
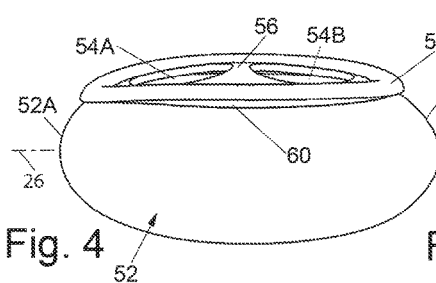
FIG. 4 is an isometric view of an alternative and preferred exemplary hollow container constructed in accordance with this invention and configured for use with another exemplary covering constructed in accordance with this invention.

A further and more preferred exemplary embodiment of a container 52 constructed in accordance with this invention is shown in FIG. 4. The container 52 is configured to be used with, i.e., disposed within, a simulation covering or "skin" 64, that is similar in construction to the skin 24 described above to result in a feeding device 50, like shown in FIG. 9. The feeding device 50 is used in the same manner as described above with reference to the feeding device 20 and is played with by the cat to feed itself in the same manner as described above. Thus in the interest of brevity the manner of use of the feeding device 50 will not be reiterated.

Figure 5A:
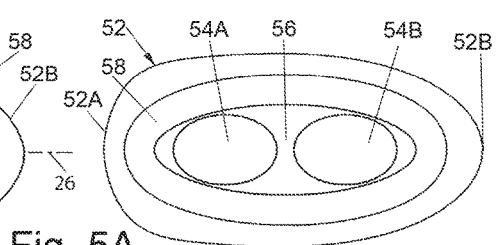
FIG. 5A is a top plan view of the preferred exemplary hollow container shown in FIG. 4.
Figure 5B:
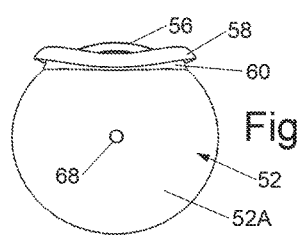
FIG. 5B is an end view of the preferred exemplary hollow container shown in FIG. 4.

As best seen in FIGS. 4 and 5, the container 52 is of an ovoid shape having a rear end portion 52A and a front end portion 52B. A central longitudinal axis 26 (FIG. 4) extends between the front end portion 52B and the rear end portion 52A. As best seen in FIG. 5A the rear end portion is has a lesser degree of curvature than the front end portion and the container 52 is of a generally circular cross-section as best seen in FIG. 5B. The container 52 is formed of a similar material to that of container 22. Unlike the container 22, the container 52 does not include a hinged lid. Instead the container 52 includes a pair of relative large openings or ports 54A and 54B located on the top portion of the container. Each port is of an oval-like shape and has a dimension of approximately 0.625 in. wide by approximately 0.81 in. long. The ports 54A and 54B serve as the means for filling the container with the requisite ration of the cat's dry food and also serve as the means through which the dry food exits when the cat plays with the feeding device 50.

The ports 54A and 54B are separated by a bridging wall 56 whose outer peripheral surface constitutes a continuation of the circular periphery of the container 52. Thus, the bridging wall doesn't impede the rolling action of the feeding device 50 when the cat plays with it. In the exemplary embodiment shown, the width of the bridging wall, i.e., the spacing between the ports 54A and 54B is approximately 0.31 in.

Figure 6:
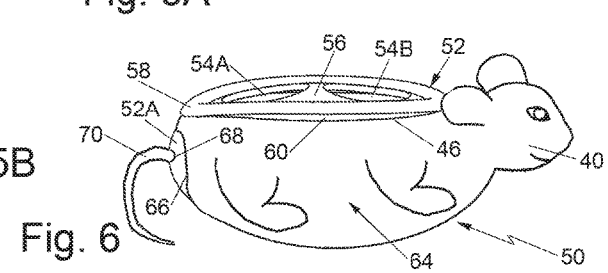
FIG. 6 is an isometric view of the preferred exemplary hollow container shown disposed within another exemplary covering constructed in accordance with this invention.

A rounded ridge 58 projects outward from the outer surface of the container 52 and surrounds the area encompassed by the ports 54A and 54B and the intermediate bridging wall 56. An annular groove 60 is located immediately below the ridge 58 and serves to cooperate with an elasticized portion of the skin 64 to hold the container within the pocket of the skin and to ensure that it doesn't shift within the pocket. In particular, as can be seen in FIG. 6, the skin 64 is similar in construction to the skin 24. In the interest of brevity the common features of the skin 64 with the skin 24 will be given the same reference numbers and the details of their construction and operation will not be reiterated. The skin 64 includes a top opening having an elasticized edge 46 which is configured to be received within the annular groove 60. Thus, when the hollow container 52 is disposed within the pocket 44 of the simulation covering 64 the elasticized edge 46 of the pocket will tightly engage the groove 60 to hold the hollow container 52 in place. Such action will prevent the simulation covering 64 from blocking either of the ports 54A or 54B when the cat plays with the feeding device 50.

The skin 64, is somewhat different than the skin 24, in one respect, namely, it includes a back opening 66 which exposes a rear portion 52A of the container 52. That rear portion includes a small aperture 68 (FIG. 5) that is in communication with the interior of the container. The aperture 68 is configured to releasably mount an item which simulates a portion of the prey animal that the skin represents. Thus, in the example shown the aperture 68 is shown mounting a flexible tail 70 to the container, i.e., the proximal end of the tail 70 is releasably mounted within the aperture 68. Other shaped tails could be mounted onto the container via the aperture to change the appearance of the prey animal. Moreover, if the skin provides the appearance of a fish, the aperture 58 can be used to mount a fish tail to the container. Similarly, if the skin provides the appearance of a bird, the aperture 58 can be used to mount a bird tail to the container. In fact, it is contemplated that the container will have an opening 58 in its front end portion 52B and that the skin 64 will have an opening in its forward end such that the container can be placed in the pocket whereupon an aperture 58 in the front end portion 52B of the container is exposed by the open forward end of the skin. In that case, an item simulating the head of the prey animal simulated by the skin 64 can be releasably mounted onto the container. Further still the container may include apertures 68 in its forward and rearward ends for use with skins having opening in their forward and rearward ends for mounting head and tail simulating items to the forward and rearward ends, respectively, of the container 52. Whether the aperture(s) 68 serve to mount a tail-simulating item or a head-simulating item, is not relevant. What is relevant is that the head or tail simulating item that the aperture 68 mounts on the container 52 is done in such a way that it can be readily removed by the cat owner. That factor and the factor that the container can be readily removed from the pocket of the skin itself, enable the cat owner to disassembly the feeding device when necessary to clean its various components. Once cleaned the feeding device can be reassembled and refilled for reuse by the cat.

It should be appreciated by those skilled in the art that the construction of each feeding device may be different than the exemplary embodiments shown in FIGS. 1-6. For example, the hollow container may be constructed like the embodiment of FIG. 4 so that it doesn't include a hinged lid, but unlike that embodiment only make use of a single large opening or hole through which the hollow container is filled. In such an alternative embodiment, the opening or hole through which the food is introduced has to be large enough to facilitate filling and to enable the interior of the hollow container to be cleaned when necessary. In such a case, the simulation covering and/or the hollow container should be constructed or configured so that the large opening is blocked by a portion of the simulation covering when the container is in the pocket of the covering to prevent the egress of the dry cat food therethrough, while enabling the dry cat food from gradually passing through one or more of the device's outlet ports.

Commercial embodiments of the system of this invention may be in the form of a kit of plural hollow containers and plural simulation coverings or skins. The skins are preferably interchangeable and can provide the appearance of the same animal or of different animals. Moreover, the skins may all be of the same color or may be of different colors. In addition, different skins may be sold separately to be substituted for the skins of the kit to provide additional stimulation for the cat.

Referring now to FIG. 7, there is shown one exemplary embodiment of a package system 120 constructed in accordance with this invention. That system basically comprises a package 122 holding plural feeding devices 124, each of which is constructed in accordance with this invention. The package 122 can be of any suitable construction, e.g., a typical paper, paperboard, cardboard or plastic carton. As pointed out above, in nature the average feral cat hunts and eats five times a day. Accordingly, in accordance with one preferred aspect of this invention the package system 120 includes at least five feeding devices 124, each of which is filled with one fifth of a cat's daily ration of dry cat food. In the exemplary embodiment shown in FIG. 4, the package 122 includes twenty-five feeding devices 124, each of which contains one-fifth of the cat's daily ration of cat food. As such the package 122 provides sufficient feeding devices 124 to feed a cat for five days.

It should be noted that the foregoing arrangement is merely exemplary, such that the package 122 can be constructed to contain as many feeding devices 124 as required to provide a cat with his/her daily ration of cat food. Thus, manufacturers of cat food can package their product in packaging systems like those of this invention for use by cat owners, whereupon those cat owners can be assured that their cats can be fed their daily ration of cat food daily.

Each feeding device 124 is preferably in the form of a hollow container or body having a central longitudinal axis 126 about which an arcuate sidewall 128 extends. The hollow container can be of any suitable shape, be it an ovoid, sphere, cylinder, etc. In the exemplary embodiment the device 124 is in the form of a cylindrical container having an arcuate, e.g., circular, sidewall 128 extending about the central longitudinal axis and a pair of planar end walls 130 and 132. The sidewalls and the end walls together bound a hollow interior cavity within the container in which the dry cat food 134 is located as can be seen in FIG. 9.

The feeding device 124 can be formed of any suitable material, e.g., paper, cardboard, paperboard, plastic or any combination thereof. The sidewall 128 includes at least one, and preferably several, frangible areas 136. Each frangible area is arranged to be opened by the person feeding the cat to form an outlet port through which the dry cat food 134 can pass when the feeding device is used by the cat. Each frangible area can be formed in various ways. For example, as shown each area 136 is formed by a line of perforations 138 in the sidewall, with each line bounding a respective frangible area. Thus, as will be appreciated by those skilled in the art the application of pressure on each of those areas by a person will cause the perforations to break, thereby providing an opening at each of those areas. Those formed openings serve as the outlet ports for the feeding device 124 to enable the egress of the cat food 134 therethrough.

As can be seen in FIGS. 7 and 8, each of the feeding devices 124 provides the visual appearance of an animal or creature, e.g., rodent, bird, fish, etc., that constitutes the prey of a feral cat. To that end, the outer surface of the device's sidewall 128 can be printed with graphics simulating the desired animal or creature. Alternatively, a printed sleeve or band bearing graphics simulating the desired animal or creature can be wrapped about the sidewall of the feeding device. In fact, any means can be used to provide the outer surface of the sidewall with the appearance of a desired animal or creature which constitutes prey of a feral cat. Moreover, the sidewall may be textured to enhance the appearance, e.g., the sidewall may include a sleeve of cover replicating fur.

In the exemplary embodiment shown the outer surface of the sidewall 128 of each feeding device 124 is printed with graphics 140 that provides the appearance of a mouse. Those graphics are is merely exemplary. Thus, each feeding device 124 may provide the appearance of some different animal or creature. In fact, the plural feeding devices 124 held within the package 122 may provide the appearance of more than one animal or creature, e.g., some feeding devices 124 in the package 122 may provide the appearance of a rodent, while other feeding devices in that package may provide the appearance of a bird, while still other feeding devices in that package may provide the appearance of a fish, etc.

By virtue of the fact that the sidewall 128 of each feeding device is arcuate (e.g., circular in the exemplary device 124 shown), that configuration enables the feeding device to rolled on any surface engaged by the sidewall. Thus, when a feeding device 124 is placed on the floor of the home in which the cat is to be fed, with the device's sidewall 128 engaging the floor, when the cat starts to play with the device, it will begin to roll about its central axis 126. That action will eventually orient the feeding device such that the dry cat food within its internal cavity to fall out of the outlet ports 136 for the cat to eat. The number, size, shape and positioning of the outlet ports can be selected to facilitate the automatic dispensing of the desired portion of the cat's daily ration of dry cat food from the feeding device.

A typical daily ration of dry cat food is approximately 1.25 cups for the average indoor cat. Thus, if the system makes use of five feeding devices 124, that 1.25 cups of dry cat food will be divided equally among those five feeding devices. In accordance with one exemplary embodiment of this invention each feeding device 124 has a length of approximately 3.5 inches and a diameter of approximately two inches.

In the embodiment of the feeding devices 124 shown in the drawing there are two frangible areas 136 in the sidewall 126 of each device. Each of those frangible areas is oval in shape and of a size of approximately 0.375 in. by 0.625 in. Those shapes, sizes and their arrangement are merely exemplary. Thus, each feeding device can include on or more frangible areas of any shape and size. Moreover, each of those areas can be located at any desired position on the sidewall 128. If more than one outlet is provided, the outlets may be arranged in any type of array. In any case, each outlet port is preferably of a sufficient size and shape to enable the dry cat food within the feeding device to gradually exit through the outlet port(s) as the cat plays with the feeding device.

As mentioned above, a preferred embodiment of the system of this invention makes use of five feeding devices 124 which are filled with the cat's regular dry food and which are disposed, e.g., hidden, at various locations in the cat's normal environment. Some cats may need a refresher course on how to "hunt" and hence feed themselves with the system of this invention. To that end, one can train the cat to use the system. In particular, such training can be accomplished by putting one half of the cat's regular meal in its bowl and one half into a feeding device constructed in accordance with this invention and which is placed near the cat's bowl. That feeding device may be in the form of the feeding device 124 as described earlier or a "trainer" device having more exit ports to allow the food to fall out more easily.

In any case, the training method should entail allowing the cat to experiment with getting the food out of the feeding device. Day after day as the cat gets the hang of it, one can gradually put more of the cat's food in the feeding device and less into the cat's bowl. Once the cat has the learned how to use the feeding device, one can then start hiding plural feeding devices in the cat's environment for it to find. Preferably that is done in the beginning by hiding the feeding devices in obvious places, e.g., a few feet away from the cat's regular dining spot. Gradually over the next few weeks, one can make the hiding spots more difficult to find. To enhance the training of the cat, one should attempt avoiding placing the feeding devices near things which produce mechanical noises, such as refrigerators, washing machines, dryers, furnaces, etc.

As should be appreciated by those skilled in the art, the fact that the feeding devices of the subject invention automatically dispense only a portion of the dry cat food therein as the cat plays with the device ensures that the release of the cat food is accomplished in a gradual manner. This action is important inasmuch as it forces the cat to slow down its eating process so that it doesn't gobble its food, which action could encourage vomiting.

While the preferred system as described above makes use of five feeding devices per day, the system may make use of any number of feeding devices per day, including only a single such device. Moreover, the construction of each feeding device may be different than the exemplary embodiment shown in FIGS. 7 and 8. For example, each feeding device may be constructed like the feeding device 20 shown in FIGS. 1-3, or the feeding device 50 of FIG. 6, or variants of any of those feeding devices.

Without further elaboration the foregoing will so fully illustrate our invention that others may, by applying current or future knowledge, adopt the same for use under various conditions of service.

We claim:
1. A cat feeding system comprising:
    a plurality of feeding devices each configured to contain and dispense a portion of cat food, each of the plurality of feeding devices including:

a container comprising a convexly curved external bottom surface, a first port and a second port arranged along a top portion of the container, each of the first port and the second port providing access to an interior space of the container configured to contain the portion of the cat food, a bridging wall separating the first port and the second port, and a raised ridge substantially surrounding the first port, the second port, and the bridging wall; and a simulation covering constructed from a flexible fabric material, the simulation covering including a pocket for removeably receiving and conforming to the convexly curved external bottom surface of the container without covering or extending over a top portion of the container including the first port, the second port, and the bridging wall, an opening edge of the pocket abutting a side of the raised ridge.

2. The cat feeding system of claim 1, wherein the container has an ovoid shape.

3. The cat feeding system of claim 1, wherein the simulation covering is sized and shaped to form a tight fit over substantially all of the container except for the first port, the second port, the bridging wall, and the raised ridge.

4. The cat feeding system of claim 1, wherein the simulation covering includes a front end including a projection having a three-dimensional shape which mimics an appearance of a head of an animal.

5. The cat feeding system of claim 1, wherein the shape of each of the first and second ports is an oval shape.

6. The cat feeding system of claim 1, wherein the bridging wall constitutes a continuation of a periphery of the convexly curved external bottom surface.

7. The cat feeding system of claim 1, wherein the side of the raised ridge includes an annular groove and the opening edge of the simulation covering includes an elastic portion, the annular groove receiving the elastic portion to retain the container within the pocket.

8. The cat feeding system of claim 1, wherein the plurality of feeding devices includes five feeding devices.

9. The cat feeding system of claim 1, wherein the flexible fabric material is furry.

10. A cat feeding device comprising:

a container configured to contain and dispense a portion of cat food, the container having an ovoid shape and comprising a convexly curved external bottom surface, a first port and a second port arranged along a top portion of the container, each of the first port and the second port providing access to an interior space of the container, and a bridging wall having a convexly curved external surface, the bridging wall separating the first port and the second port, a raised ridge surrounding the first port, the second port, and the bridging wall and including an annular groove; and a simulation covering constructed from a flexible fabric material, the simulation covering including a first projection having a shape which mimics an appearance of a head of a mouse extending from one end and a second projection having a shape which mimics an appearance of a tail of a mouse extending from another end, the simulation covering including a pocket for removeably receiving and conforming to the convexly curved external bottom surface of the container without covering or extending over the top portion of the container including the first port, the second port, and the bridging wall, an elastic opening edge of the pocket extending into the annular groove to hold the simulation covering in place relative to the container.

* * * * *